L. I. LELIEVRE,
IRRIGATING FLOWER POT.
APPLICATION FILED JAN. 10, 1918.

1,264,096.

Patented Apr. 23, 1918.

WITNESSES

INVENTOR
Leonard I Lelievre,
BY
ATTORNEY

UNITED STATES PATENT OFFICE.

LEONARD I. LELIEVRE, OF SEATTLE, WASHINGTON.

IRRIGATING FLOWER-POT.

1,264,096. Specification of Letters Patent. Patented Apr. 23, 1918.

Application filed January 10, 1918. Serial No. 211,233.

*To all whom it may concern:*

Be it known that I, LEONARD I. LELIEVRE, a citizen of the United States, residing at Seattle, in the county of King and State of Washington, have invented certain new and useful Improvements in Irrigating Flower-Pots, of which the following is a specification.

This invention relates to improvements in flower pots and more particularly to those in which the plants are watered by capillary attraction.

The primary object of the invention is to construct a pot of this character whereby moisture is automatically supplied to the earth in a flower pot surrounding the roots of the plants by capillary attraction.

Another object is to so construct a pot of this character that the water supply tank will be completely housed and hidden within the pot.

Another object is to provide a pot of this character so constructed that the plants contained therein will be amply supplied with water fed up from the bottom around the roots thereof and yet all danger of the support for the pot being injured by water leaking therefrom is avoided, thus permitting the use of growing plants for decoration instead of expensive cut flowers.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
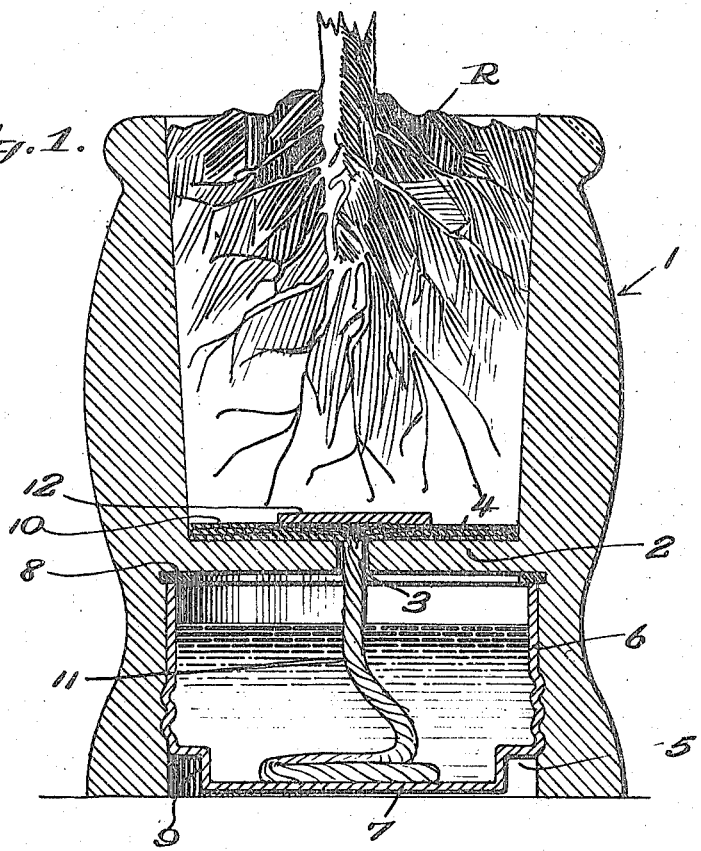
Figure 2:
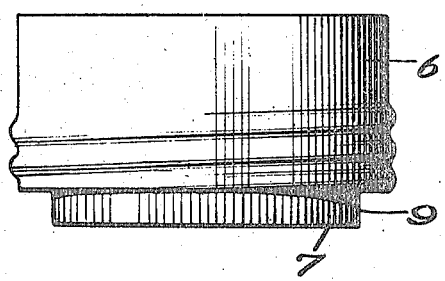

Figure 1 represents a vertical section of a pot constructed in accordance with this invention, and Fig. 2 is a side elevation of the water reservoir or tank used in connection with this pot.

In the embodiment illustrated, a flower pot or vase 1 is shown which may be of any desired size or shape and constructed of any suitable material, preferably of a semi-transparent substance for a purpose presently to be described. This pot 1 as shown, is substantially cylindrical and has a horizontal partition 2 arranged near the lower end thereof and provided with a central aperture 3. This partition divides the pot into a chamber 4 for the reception of the earth in which the plant is to be embedded, the roots of which are shown at R. Below the partition 2 is a reservoir containing chamber 5 in which is removably mounted a water containing tank or reservoir 6 constructed of any suitable material, preferably of glass, and which is detachably mounted in the chamber 5 in any suitable manner, it being here shown screwed into the side walls of chamber 5 as is shown clearly in Fig. 1, but obviously it may be removably held therein by any suitable means. This reservoir 6 in the form shown, comprises a cup-like container shaped to conform to the chamber 5 and is of a depth substantially equal to or slightly less than the height of chamber 5 so that the bottom 7 of said container will be spaced slightly above the supporting surface of the pot when the parts are assembled as is shown clearly in Fig. 1. A gasket 8 is shown arranged between the upper edge of the reservoir 6 and the lower face of the partition 2, said gasket being preferably in the form of a rubber band, glued or otherwise secured to the partition 2 to render the reservoir water-tight when in operative position so that the pot may be moved from place to place without danger of the water being spilled.

This reservoir 6 is also provided with suitable gripping means to facilitate the insertion and removal of the reservoir, said means being here shown in the form of a depression 9 around the bottom 7 of said reservoir, but it is obvious that any other means may be provided.

A disk or pad 10 of porous fabric, preferably felt, is arranged within the bottom of chamber 4, and has a wick 11 of similar material extending from the center of its lower face downwardly through the opening 3 in partition 2, and is of a length sufficient to reach the bottom of the reservoir and to lie in folds thereon. This arrangement of disk and wick provide for the supply of water by capillary attraction to the earth contained in chamber 4.

A metal or other suitable non-porous disk 12 is disposed on top of the porous disk 10 directly over the aperture 3 in partition 2 and is of a size to hold disk 10 firmly in position and to prevent the roots of the plant from extending into the drain opening or wick passage 3.

It is of course to be understood that this flower pot or vase 1 may have its exterior decorated in any desired manner and it is preferably made of semi-transparent material so as to permit the water within the reservoir to be observed without necessitating the removal of the reservoir so that it may be replenished when necessary.

In the use of this pot, water may be placed in the reservoir 6 before it is inserted within the chamber 5, or it may be supplied by pouring it into the top of pot 1, the excess draining into the reservoir and will be slowly absorbed by the porous wick 11 and disk 10 by the earth in the pot, thus feeding the roots as needed.

A vase constructed as above described may contain a growing plant or plants and placed on a table, desk or in any other place without danger of marring its support by dripping water.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A flower pot having an aperture in its bottom, an absorbent member arranged inside said pot on said bottom and having a wick extending through the aperture in said bottom, and means for holding said absorbent member in position and for preventing the entrance of the roots of a plant into the aperture in said bottom.

2. A flower pot of the class described having a horizontal partition arranged therein at a point spaced from its lower end to form an earth receiving chamber above it and a water container chamber below it, said partition having an aperture therein, an absorbent member disposed in said earth chamber and having a wick extending through the aperture in said partition into the water container, and means for holding said absorbent member in position and for preventing the entrance of the roots of a plant into the aperture in said partition.

In testimony whereof I affix my signature in presence of two witnesses.

LEONARD I. LELIEVRE.

Witnesses:
GLADYS ALLEN.
C. JACKSON.